May 9, 1933.       H. L. JOHNSTON ET AL       1,908,153
FOOD HANDLING APPARATUS
Filed May 14, 1928       5 Sheets-Sheet 2

INVENTOR
Herbert L. Johnston &
David A. Meeker
BY Marichal and Noe
ATTORNEY

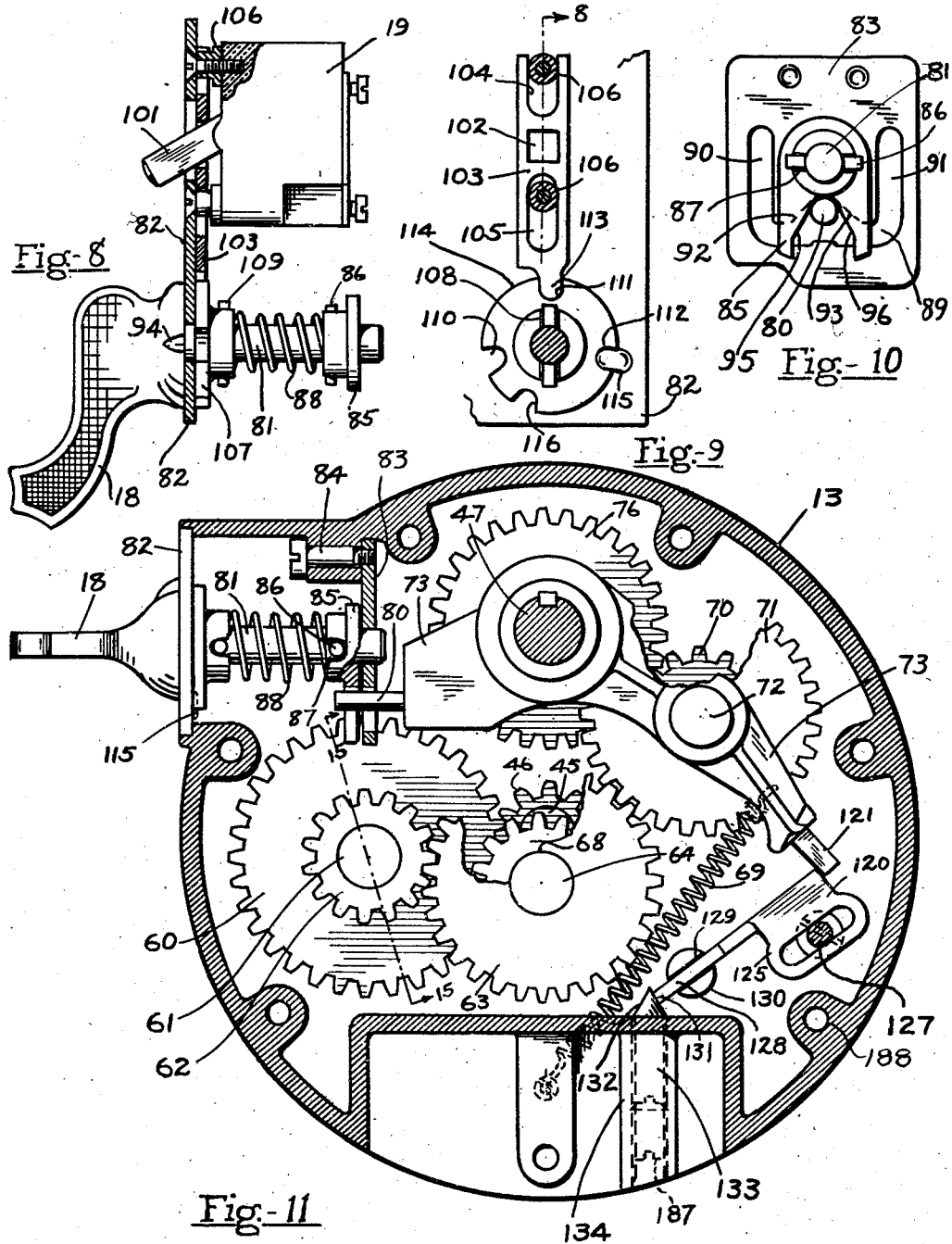

May 9, 1933.    H. L. JOHNSTON ET AL    1,908,153
FOOD HANDLING APPARATUS
Filed May 14, 1928    5 Sheets-Sheet 4

INVENTOR
Herbert L. Johnston &
David A. Meeker
BY  marechal and Noe
ATTORNEY

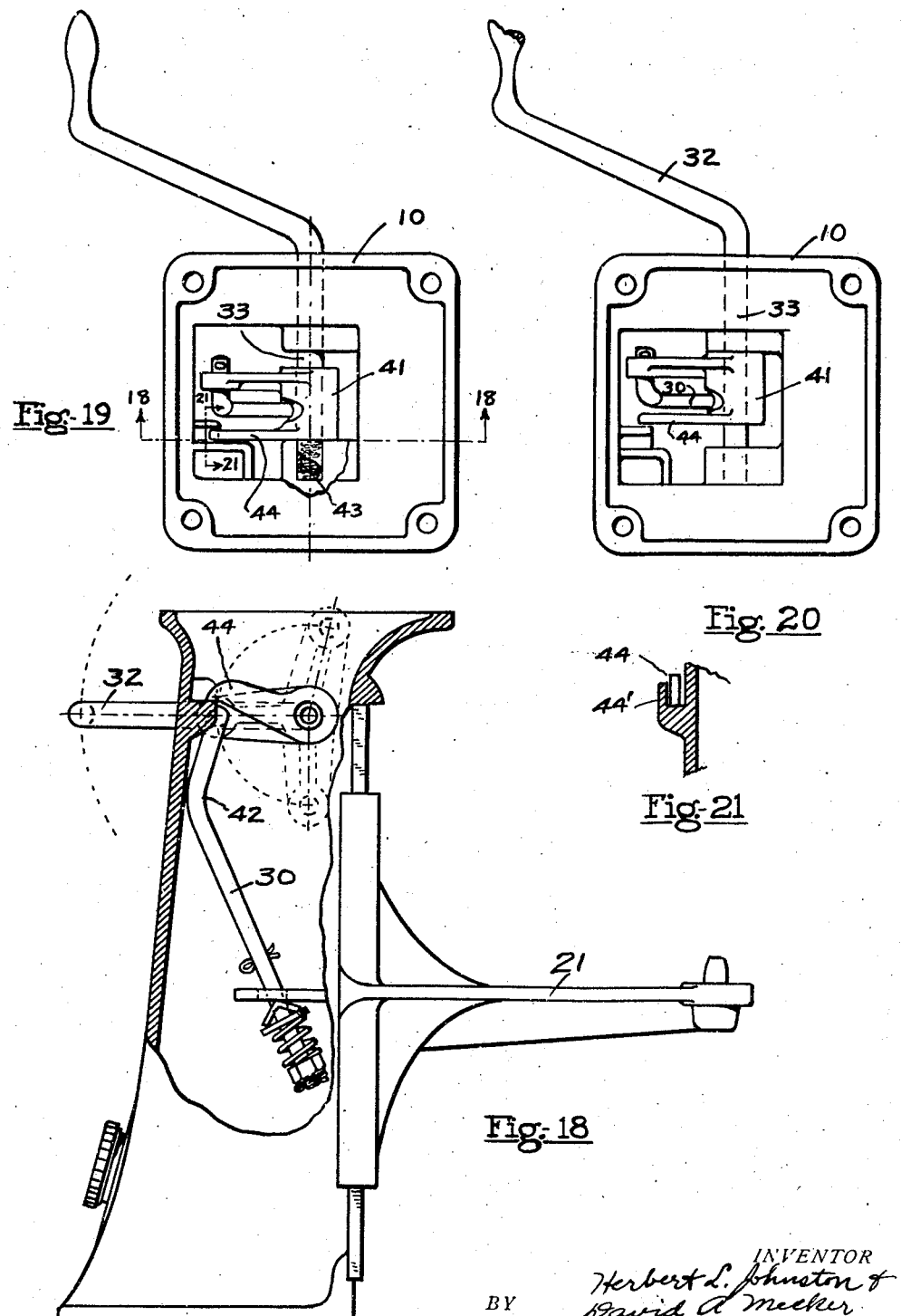

Patented May 9, 1933

1,908,153

UNITED STATES PATENT OFFICE

HERBERT L. JOHNSTON AND DAVID A. MEEKER, OF TROY, OHIO, ASSIGNORS, BY MESNE ASSIGNMENTS, TO THE KITCHEN AID MANUFACTURING COMPANY, OF TROY, OHIO, A CORPORATION OF OHIO

FOOD HANDLING APPARATUS

Application filed May 14, 1928. Serial No. 277,616.

This invention relates to apparatus for handling or mixing foodstuffs or other material.

One object of the invention is the provision of an apparatus of this character having an electric motor for driving the same, and embodying change-speed and speed-reducing gearing compactly arranged to provide a compact machine of small size and dimensions.

Another object of the invention is a provision of a change-speed gearing adapted for use in an apparatus of this character and embodying an adjustable or movable gear which is adapted to be bodily rotated about an axis and also shifted endwise in changing-speed ratios, and having a gear-changing member which has but one freedom of motion to effect the operation of the adjustable gear.

Another object is the provision of gearing adapted for use in a mixing machine embodying an adjustment for differentially varying backlash of a plurality of gear engagements.

Another object of the invention is to provide a change-speed gearing of the character mentioned, having simple adjusting mechanism for varying the backlash for the adjustable gear and a gear engaged thereby.

A further object is the provision of a motor-driven mixing machine of the character mentioned incorporating a change-speed gearing, which has a control switch interlocked with the speed-changing device to prevent improper operation of the machine.

Still another object of the invention is the provision in a mixing or food-treating machine having a bowl which may be raised or lowered, of a simple mechanism for raising and maintaining the bowl in its raised position in cooperative association with the food-treating member.

Other objects and advantages of the invention will be apparent from the following description and from the accompanying drawings in which Fig. 1 is a side elevation of a mixing machine embodying the present invention;

Fig. 8 is a horizontal section through the control switch and interlock on the line 8—8 of Fig. 9;

Fig. 9 is a rear elevation of the control switch and interlock;

Fig. 10 is a detail of the stationary and the rotatable cam plates;

Fig. 11 is a vertical section on the line 11—11 of Fig. 1;

Fig. 18 is a side elevation of the pedestal with the bowl support in a mid-position, part being shown in section;

Fig. 19 is a top plan view of the pedestal as shown in Fig. 18;

Fig. 20 is a top plan view of the pedestal with the handle in free or released position; and Fig. 21 is a vertical section through the mid-position stop of the bowl support on the line 21—21 of Fig. 19.

Figure 1:
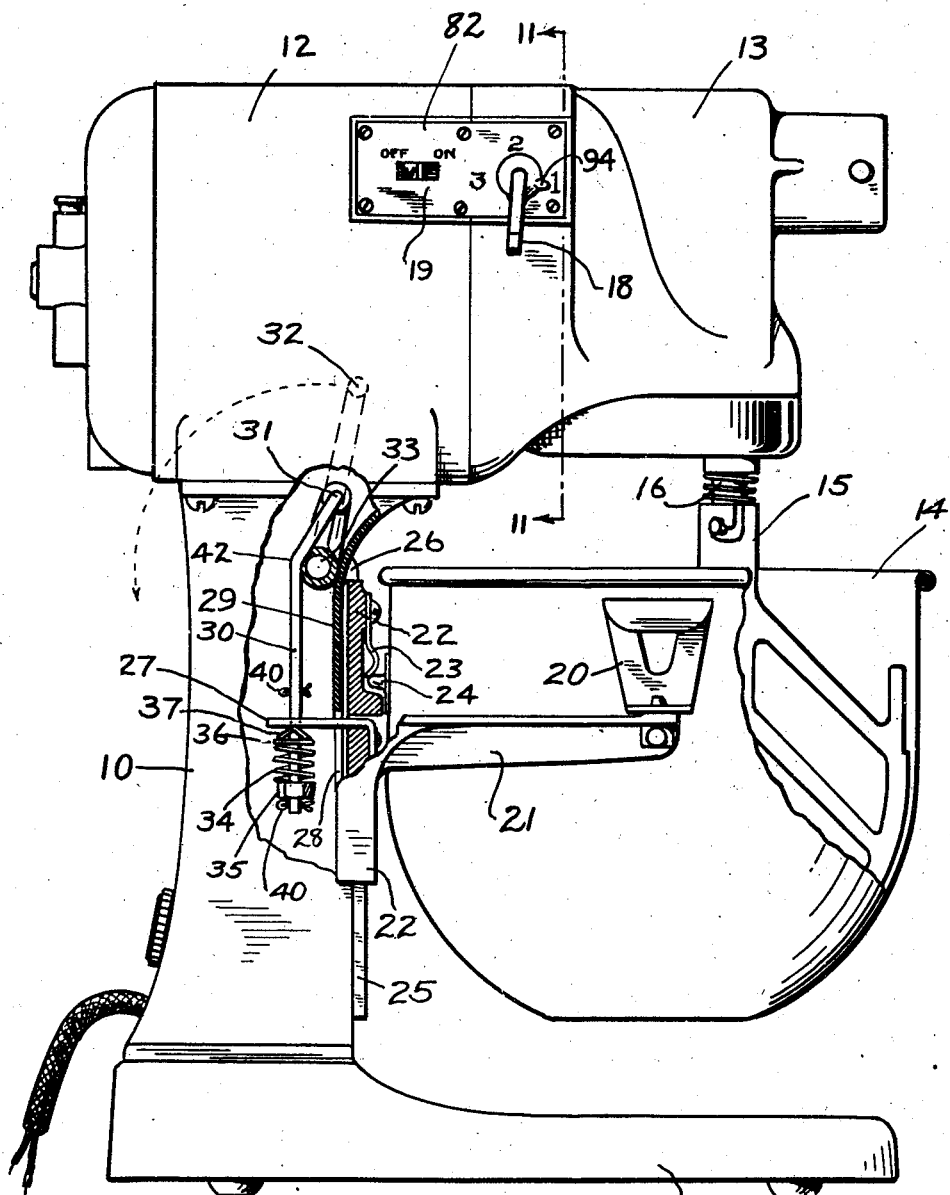

Referring more particularly to the drawings Fig. 1 shows a mixing machine adapted for stirring, beating, mixing or otherwise handling foodstuffs, dough or other material, the machine shown being of the type especially adapted to be used in the household. As shown, the machine comprises an upright standard 10 supported by the base 11 and in turn supporting an electric motor 12, a gear-changing and speed-reducing housing 13 and a mixing bowl 100

14. The gear housing 13 is approximately coextensive in its lateral and vertical dimensions with the motor housing to which it is attached and by which it is supported. The mixing bowl cooperates with a beater arm 15 which is operated from a shaft 16 driven from the motor through the gear-changing device mentioned. A control handle 18 is adapted to be manually operated to select the proper speed for suitable operation of the beater arm 15, and an electric control switch 19 is provided to control the starting and stopping of the motor 12.

To effect the raising and lowering of the mixing bowl a simple mechanism is provided which may be easily operated and which maintains the bowl in a raised position without requiring the operation of locking pawls or similar operable locking devices. The mixing bowl 14 is provided with side brackets 20 which are seated upon the ends of supporting arms 21 provided on a bowl support 22 so that they extend along opposite sides of the bowl and assume the entire weight of the bowl and its contents. The bowl support 22 is preferably provided with a spring 23 which is engaged by a small nose 24 provided on the rear of the bowl, to hold the bowl firmly on the support and prevent it from tilting during the operation of the beater arm.

Figure 7:
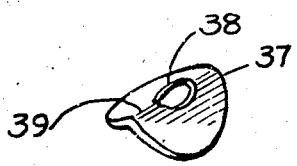
Fig. 7 is a detail of a part of the bowl-raising mechanism.

The bowl support 22 is adapted to move up and down along the standard 10 which is provided with a slide guide 25 for this purpose the opposite side edges of which guide the movements of the support 22. When the bowl is in its raised position the top of the bowl support 22 engages a pair of laterally spaced stop lugs 26 provided in the standard so that the upper limit of movement of the bowl is thus definitely determined. Rigid with the bowl support 22 is an arm 27 which extends rearwardly through a vertical slot 28 in the forward wall 29 of the standard. This arm 27 is provided with an opening through which a link 30 extends, this link being pivotally connected at 31 to a control or lift handle 32 which is pivoted on the standard at 33. The link 30 as previously mentioned extends through an opening in the rigid arm 27, where the link and the arm are operably connected together by means of a spring 34 which bears at one end against a nut 35 provided on the bottom end of the link, the top of the spring pressing against a pressure plate 36 on which rests a bent thrust member 37. This thrust member as shown in Fig. 7 is provided with a central hole 38 through which the link 30 extends, and the ridge 39 on this bent thrust member engages the rigid arm 27 so that the weight of the bowl acting on this arm is transmitted through the spring to the link 30. Cotter-pins 40 in the link 30 are provided below the nut 35 and above the arm 27 as shown. When the lever 32 is in the position shown in Fig. 1 the bowl-raising link 30 and lever 32 constitute in effect a closed toggle the weight of the bowl or the bowl and its contents being transmitted through the arm 27 and link 30 to the control lever in such a way as to tend to maintain the control lever in bowl-raised position as shown in this figure. This is due to the fact that the axis 33 of the control lever is somewhat out of alignment with the points of connection of the link 30 and with the control lever and with the arm 27, the axis 33 as shown in Fig. 1 being slightly to the left of the line through these points, and the link 30 being bent at the point 42 for this purpose. When the lever is in bowl-raised position, as shown, the spring 34 is compressed between the nut 35 and the arm 27, the upper limit of movement of the arm 27 being limited by the stops 26 which are so positioned that the spring 34 will be compressed when the bowl is in its uppermost position and in cooperative association with the beater arm 15. When the control handle 32 is rotated in a counter-clockwise direction as shown by the dotted arrow in Fig. 1 the initial movement will cause a further compression of the spring 34 since the arm 27 cannot move upwardly from the position shown. Then after the points 31, 33 and 39 are aligned, further lowering movement of the control handle will permit the bowl support to be lowered, and the lowermost position of the bowl may be defined by the realignment of the points 31, 33 and 39 when the control handle extends downwardly from its pivotal support. It will thus be understood that the removal of the bowl 14 may be easily effected and that the bowl may be very easily adjusted or moved into its elevated position in cooperative relation with the beater arm. Furthermore the construction is such that the bowl support is locked firmly yet yieldingly against the stops in its upper position by the action of the spring 34 so that vibration and rattle of the bowl support will not take place. The bowl being held firmly yet yieldingly on the bowl support permits no noise and rattle to occur between those parts and the bowl support just described eliminates noise and rattle between the support and the standard, the result being a perfectly quiet arrangement yet one which permits variations in the bowl height and its quick removal from the machine.

The bowl-raising mechanism also has provisions for holding the bowl in a partly raised or mid-position. As shown in Figs. 18, 19 and 20 the control handle shaft 33 has mounted in fixed position thereon, a block 41 located between the bearings in the sides of the standard and shorter in extent than the distance across these bearings to permit some endwise movement of the shaft 33. The shaft 33 and the control handle are normally pressed outwardly to the position indicated in Fig. 20 by a spring 43 bearing against the hollow end of the shaft and against the standard side, and in this position the block 41 rotates with the shaft without any effect on the mechanism. However when the handle is pressed in towards the standard after the bowl has been partly raised, a tongue 44 on the block 41 is brought over a socket stop 44' and if the handle is then lowered some little distance the tongue will be retained in the socket stop and the bowl held partly raised or in a mid-position. To lower the bowl from this mid-position it is merely necessary to move the handle angularly in the direction for raising the bowl and after a small angular motion of the handle the tongue will be freed from the socket and the spring 43 moves the handle and its shaft outwardly. The bowl is therefore very easily adjusted and is held either in raised or lowered position, or in a mid-position, by the proper operation of the single control handle. This bowl raising mechanism is described and claimed in the divisional application, Serial No. 330,837, filed January 7, 1929, now Patent No. 1,767,002, dated June 24, 1930.

Referring more particularly to Figs. 2 to 5 and to Fig. 11, the motor 12 has a motor shaft 45 on the end of which is a pinion 46. This pinion is adapted to cause the rotation of a driven shaft 47 in the upper portion of the gear casing 13 at high, low or intermediate speeds dependent upon the character of material being treated by the arm 15 in the bowl. The shaft 47 is journaled at its ends in bearings 48 and 49 provided in the gear housing 13. Adjacent the bearing 48 the driven shaft carries a bevel gear 51 which meshes with gear 52 carried on a vertical shaft 53 which is below the shaft 47 and in the same vertical plane. The shaft 53 is rotatably mounted in the long fixed bearing 54 and the lower end of the shaft is pinned to a rotatable assembly 55. The shaft 16 is rotatably mounted in the assembly or planetary head 55 at a point spaced from the axis of the shaft 53, and is provided with a driving pinion 56 which meshes with an internal gear 57 carried by the housing. The shaft 16 is thus rotated about its own axis while it is being moved about the axis of the shaft 53 to efficiently mix and stir the material in the bowl. Shaft 47 as shown, is journaled in the end of casing 13 adjacent the top of the casing and the end of this shaft is suitably socketed to provide a coupling or clutch member cooperating with the internally tapered coupling hub around it to provide an attachment drive for auxiliary apparatus.

Figure 2:
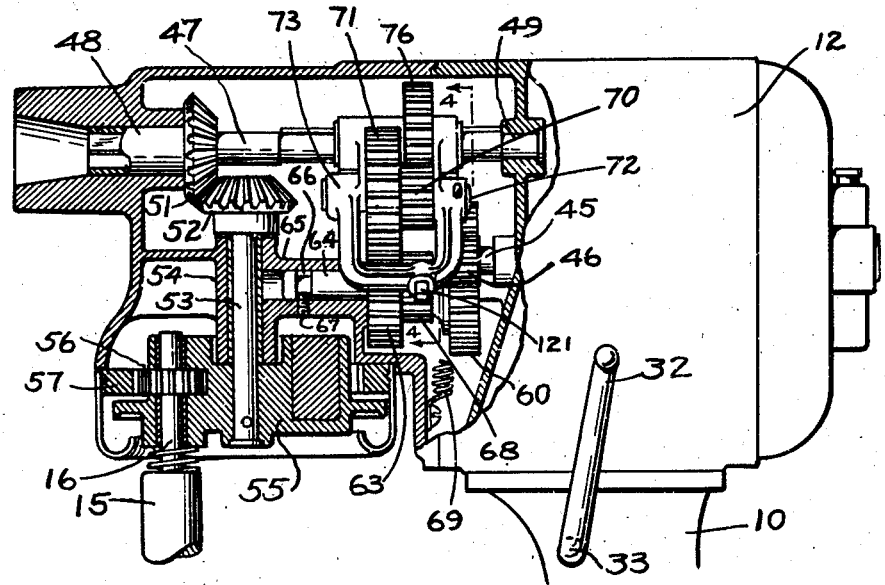
Fig. 2 is a partial view of the reverse side of the machine, partly in vertical section.
Figure 15:
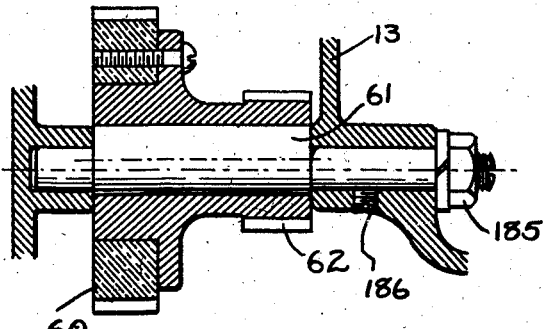
Fig. 15 is a section thru the counter-shaft gears on line 15—15 of Fig. 11.

The motor pinion 46 engages constantly with the gear 60 rotatable on a counter-shaft 61 mounted at one side of the motor shaft in the housing and which also carries a pinion gear 62 fixed to gear 60 and engaging gear 63 on a short shaft 64. The gear 62 is not shown in Fig. 2 as it lies behind the gear 63 but the construction will be apparent from Figs. 11 and 15. The shaft 64 on the free end of which the gear 63 is rotatably journaled is fixed at one end in a stationary bearing 65 by means of a retaining screw or stud 67. This shaft 64 also carries a pinion 68 journaled on the end of the shaft adjacent the gear 63. These gears 63 and 68 are adapted to be selectively engaged by gears 70 and 71 which are rigidly interconnected for simultaneous rotation and which are rotatably mounted on a shaft 72 supported in an adjustable frame or yoke 73. This frame or yoke is rotatably adjustable about the axis of the shaft 47, which is parallel to and spaced from the shaft 72. The frame is also adapted to be shifted longitudinally of the shaft 47 from its intermediate position as shown in Fig. 2. The frame carries a driven gear 76 which is keyed to a sleeve 75 which in turn is keyed to but axially shiftable on the shaft 47, gear 76 being constantly in mesh with the small gear 70 carried by the frame.

Figures 3, 4, 5:
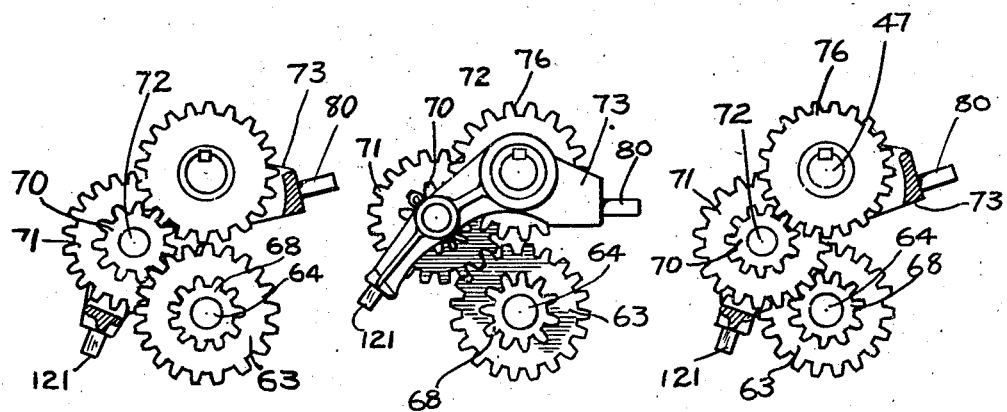
Figs. 3, 4 and 5 are representations of the various positions of the adjustable speed-change gear for high-speed, intermediate-speed and slow-speed operation of the mixing arm or member respectively.
Figure 6:
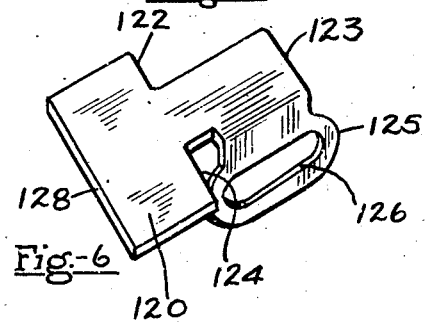
Fig. 6 is a detail view of the backlash stop.

When the adjustable frame 73 is in the position shown in Fig. 2 the motor pinion 46 drives the connected gears 63 and 68 through the speed-reducing train of gears 60, 62 and 63. Gear 63 at this time engages gear 71 and thus through the small gear 70 causes a rotation of the gear 76 and the shaft 47. The frame 73 may be moved to the left and simultaneously move about the axis of the shaft 47 in a direction separating the gears to disengage the gears 63 and 71. After the frame 73 has been moved laterally a distance slightly exceeding the width of the gear 71 it may then be rocked about the axis of the shaft 47 to cause the small gear 70 to engage the large gear 63, thus providing for high-speed operation of the shaft 47. This arrangement of the gearing is shown in Fig. 3. From this position the adjusting frame 73 may be moved about the axis of the shaft 47 to first disengage gears 70 and 63 and then move the axes of the gears 63 and 71 sufficiently apart so that these gears will not clash when moved past one another. The frame may then be moved to the right back to the position indicated in Fig. 2. From this position it may be moved still further to the right to cause a low-speed operation of the beater arm, and when so moved to the right and then rocked about the axis of the shaft 47 the pinion 68 will be engaged by the large gear 71 carried by the frame and the shaft 47 will thus be driven at a comparatively slow speed from the motor. When the gear-supporting frame is moved from the slow-speed position it is first necessary to move it about the axis of the shaft 47 until the two large gears 63 and 71 are relatively displaced far enough to permit the lateral movements of the frame 73 without causing these two gears to clash. The low-speed arrangement of the gearing is shown in Fig. 5. By reason of a gearing construction as just described it is possible to enclose the gears in a box or housing of minimum size supplied with suitable lubricant for the operating parts, while still obtaining sufficient reduction in speed at the beater arm and sufficient range of speed variation.

It will now be apparent that the construction just described provides a very compact arrangement of the pedestal or standard, the motor, and the gear-changing and speed-reducing gearing, so that a compact apparatus of small dimensions and minimum height is attained. The gear casing 13 is provided on the forward side of the motor housing 12, these two parts being connected by suitable attaching bolts which pass through the attaching holes 188 apparent in Fig. 11. The electric motor is mounted directly above and on the top of the pedestal or standard, with its axis of rotation extending horizontally toward the front of the machine so that the power may be directly supplied to the gear-changing and speed-reducing mechanism. The arrangement of the power transmission in the gear casing is particularly advantageous since it is quite compact and permits the various gears and shafts to be contained and lubricated in a small housing which is substantially coextensive in height and width with the dimensions of the motor housing, and which is preferably formed as a continuation of the end of the motor housing. It will be noted that the power is taken off laterally from the motor pinion 46 through speed-reducing mechanism, and the power is then transferred from a comparatively low point of the casing, through the tumbler or speed-varying gears, to a driven shaft 47 which extends towards the front of the machine parallel with and above the motor axis and which is provided at an upper part of the gear casing. The tumbler or shifting gears 70 and 71 carried by the shifting frame are provided on the opposite side of the vertical center of the gear casing, away from the speed-reducing gears 60 and 62 to utilize substantially all of the available space in the gear casing in a compact manner. The driven shaft 47 is journaled at its end in the outer side of the gear casing to provide a power take-off at this convenient point of the apparatus adapted to be clutched or connected to any suitable auxiliary apparatus to be driven such as a meat chopper or coffee grinder or the like, which may be used in conjunction with the mixing machine. Below the driven shaft 47 and in the same plane therewith the short vertical shaft 43 which drives the beater arm is so arranged that a sufficiently long bearing is provided to take care of the forces involved, the arrangement also being such that this shaft 53 is provided compactly within the gear box where it may be well lubricated. This mixing machine construction is described and claimed in the divisional application, Serial No. 514,150, filed February 7, 1931.

The gear-supporting frame 73 is moved bodily and is rotated about the axis of the shaft 47 by means of a pin 80 which is operated from the rotatable control member 18 in the following manner: The control member 18 has a single freedom of motion, the construction shown providing for rotational movements of the lever about the axis of a shaft 81 with which it is rigidly connected, and which is rotatably journaled in the mounting plate 82 and in a fixed cam plate 83, which is mounted parallel to the plate 82 by means of the bolts 84. A rotatable cam plate 85 is fixed against rotation on the shaft 81 by means of a pin 86, which engages a pin slot 87 on the hub portion of this plate, and a spring 88 engages this hub portion to normally maintain the two cam plates adjacent one another. The fixed cam plate 83 is provided with a cam slot 89 having vertical portions 90 and 91 shaped to receive the operating pin 80 on the gear frame 73, and having cam surfaces 92 and 93 along which the operating pin 80 rides from the central position shown in Fig. 10 (corresponding to the intermediate speed-gear arrangement). When the control handle 18 is so adjusted that the index point 94 is adjacent position 2, see Fig. 1, the parts will be in the position indicated in Figs. 8 to 11 inclusive, corresponding to the intermediate-speed positioning. A clockwise rotation of the control handle 18 from this position will cause the operating pin 80 to be moved along the cam surface 92 to lower the pin 80 and thus raise the frame and at the same time shift the gear frame 73 laterally to disengage the gears 71 and 63, this motion of the pin 80 being caused by the movable cam plate 85 which as shown, is provided with camming surfaces 95 and 96. The weight of the gears 70 and 71 and of the main portion of the yoke or frame 73 is overcome by the pressure exerted on the pin 80 by the surface 95 or 96, moving it along the surface 92 of the fixed cam plate 83, so that the gear 71 is drawn away from the gear 63 by the time the pin 80 enters the lower end of slot 90 in the fixed cam plate. A spring 69 may be provided to assist in bringing the gears into engagement by lowering the frame, especially where thick oil is to be used in the gear box which might prevent rapid downward movements of the frame. Upon the completion of the rotary movement of the control lever 18 in bringing the pointer 94 opposite position 3 the weight of the gears 70 and 71 and of the frame 73 causes the pin 80 to rise in the slot 90, this motion being assisted, if need be, by the outer portion of the cam surface 96 of the movable cam plate. This motion of the pin is effective in lowering the gear 70 into engagement with the gear 63 for high-speed operation of the beater arm, it being understood that the lateral motion of the pin 80 from its intermediate position to the cam slot 90 has shifted the movable gear assembly along the axis of the shaft 47. Clockwise rotation of the control lever 18 from this high-speed positioning causes the cam surface 95 of the movable cam plate to first lower the pin 80 and raises the gear 70 out of engagement with the gear 63, the weight of the gear assembly assisted by the action of spring 69 then causing the pin 80 to rise as it is moved toward the intermediate position shown in Fig. 10. It will be apparent that movement of the control lever 18 to a position, as shown in Fig. 1, corresponding to low-speed operation, moves the pin 80 downwardly and laterally and then upwardly in the cam slot 91 to bring the gears to the position shown in Fig. 5 where the shaft 47 is rotated at comparatively slow speeds by the motor. The gear ratio is thus changed in a very quick and easy manner by merely rotating the control handle to the desired position for the proper operating speed of the beater.

In the construction of the mechanism by which the gear-shifting frame is moved the cam plate 83 cooperates with the cam pin 80 of the gear-shifting frame to lower the gears 70 or 71 as the case may be into the proximity of the gears 63 and 68 and permit full meshing engagement of the selected gear. In case the peripheral tooth surfaces of the two gears about to mesh come into contact thus temporarily preventing full meshing engagement, as soon as the motor starts and gears 68 and 63 make even a very small rotational movement the proper meshing occurs. The full meshing of engaging gears is completed automatically without further operation on the part of the attendant, the comparatively small angular movement of the frame 73 to bring one of the gears of the gear tumbler into full meshing engagement with the gear that drives it being without effect upon the control handle 18 due to the provision of sufficient lost motion in the mechanical connection between these parts.

Figure 12:
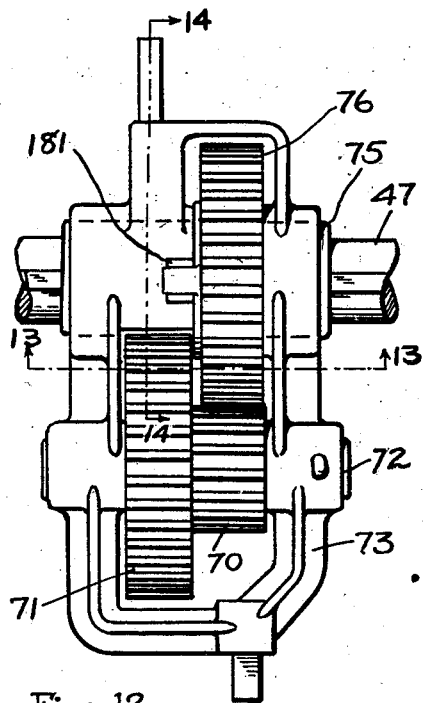
Fig. 12 is a detail of the shifting frame and gear arrangement.
Figure 13:
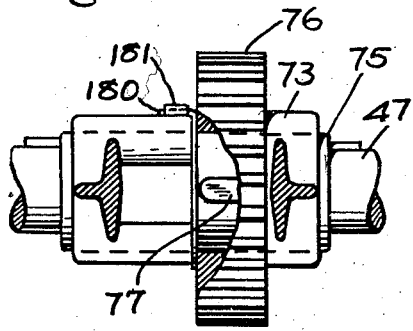
Fig. 13 is a section on line 13—13 of Fig. 12.
Figure 14:
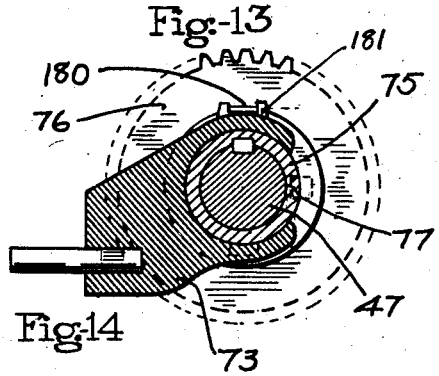
Fig. 14 is a section on line 14—14 of Fig. 12.
Figure 16:
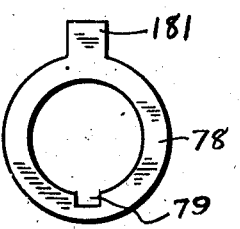
Fig. 16 is a detail view of the lock washer.

The construction of the yoke or frame 73 and the manner in which the yoke and the gear 76 are supported and assembled is shown in Figs. 12 to 14. The yoke 73 is freely rotatable on the drive sleeve 75 which is keyed to but axially movable along shaft 47. Before the gears 70, 71 are assembled on the yoke 73, the gear 76 is keyed to the drive sleeve 75 by a short key 77 having a length corresponding to the gear width. On the inner side of the gear 76 is a key-retaining washer 78 having a notch 79 and a lock ear 180. With the lock ear extending to the rear the notch 79 will be at the open side of the yoke hub, and as the gears 70 and 71 are not in place at this time, the key 77 may be inserted into the short key slot in the sleeve and the sleeve and key together moved axially into gear 76 and along the frame 73 into its proper position. Axial movement of the sleeve and key in relation to the washer 78 during assembly is permitted by the notch 79 but after the sleeve is in position it is retained against endwise movement in relation to the frame 73 by the key which is definitely fixed in relation to the sleeve by the length of the keyslot, this key abutting against the frame 73 on the one hand and against the washer 78 which has been turned about 90° to bring the notch 79 and the open side of the frame bearing out of registration. The washer 78 is held in the turned key retaining position by bending the lock ear 180 down between two retaining lugs 181 on the yoke. Thus the key 77 is retained within the gear 76 and this also prevents shifting movements of the yoke along the sleeve 75. The gears 70 and 71 may now be added by inserting the shaft 72 endwise into the yoke and through these gears, the shaft 72 being then retained against endwise movement by a suitable cotter-pin.

Figure 17:
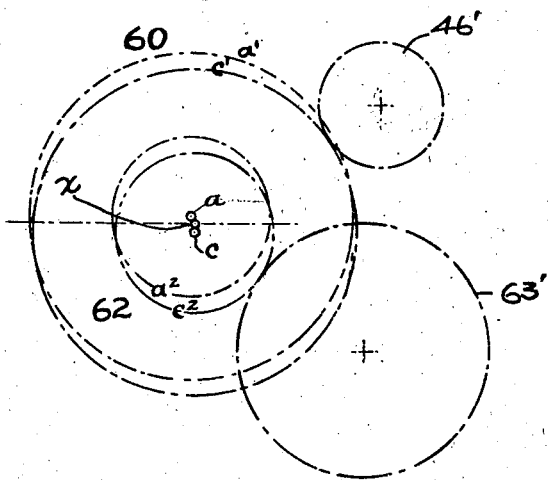
Fig. 17 is a schematic showing of the differential gear-spacing adjustment.

The small pinion 46 on the motor shaft 45 of course rotates at a comparatively high speed and drives a much larger gear 60 which is preferably provided with a tooth-providing rim portion of fiber to reduce noise during operation. Gear 60 is fixed to smaller gear 62 which drives the speed-reducing gear 63. The shaft 64 on which the gear 63 is rotatably supported lies somewhat below the level of the shaft 61, see Figs. 11, 15 and 17, while the motor shaft 45 lies somewhat above that level. Shaft 61 is eccentrically mounted at its ends the eccentricity being a matter of only a few thousandths of an inch and being shown somewhat exaggerated in Fig. 15 so that it will be apparent. The eccentric adjustment is permitted when the lock nut 185 threaded on the end of the shaft 61 and the set screw 186 are loosened, the end of the shaft 61 being slotted so that it may be rotatably adjusted, and then held in adjusted position by the set screw and the lock nut. By reason of the eccentric adjustment of shaft 61 the gears 60 and 46 may be adjusted as to centers so that they run noiselessly and the gears 62 and 63 may also be regulated for the proper backlash for noiseless operation. Referring now to Fig. 17 the eccentric adjustment and gear-center regulation is shown but to a greatly exaggerated degree. As a matter of fact the eccentric adjustment amounts to only a few thousandths of an inch but the points $a$ and $c$ designating two different positions of the center of shaft 61, are graphically shown considerably spaced from the center $x$ of the eccentric bearing support. The pitch circles of gears 46 and 63 are indicated at 46′ and 63′ (the displacement of these circles above and below the level of the point $x$ being greatly exaggerated for illustration). It will be noted that as the axes of the gears 46 and 63 lie in different planes containing the axis of the shaft 61, the adjustment of the center distances to the gear 46 and to the gear 63 is effected in a differential manner, the arrangement being such that the axis of shaft 61 can be moved toward both the driven and the driving gear, and also providing for movements of the axis of the shaft 61 toward one of these gears and away from the other. In the particular construction illustrated in Fig. 17, it is intended that the distances between the driving and driven gears and the point $c$, approximately the lowest point of adjustment axis of shaft 61, will be the theoretically correct distances for proper noiseless operation of both the driving and the driven gears. Thus the circles $c^1$ and $c^2$ show the pitch lines exactly meshing with the pitch circles 46' and 63' respectively. However, if it is found upon assembling the gears in this manner, that there is too much backlash in the engagement of one or the other of these driving or driven gears, the position of the axis of the shaft 61 may be adjusted about the center $x$ so as to increase or decrease the spacing of the axis, or to move these axes in a differential manner and throughout different distances. For example, if it is found that when the axis of the shaft 61 is at the point $c$, the engagement or mesh of the gear 63 is too tight, and the gears are noisy, while at the same time the engagement of the gear 46 is too loose, the axis 61 may be moved from the point $c$ up to the point $a$ approximately on the opposite side of the center $x$, it being apparent that the adjustment of the axis of shaft 61 increases slightly the distance to the axis of gear 63 and decreases the distance to the axis of gear 46. It is also apparent that by moving the axis 61 through small angular adjustments about the center, for instance moving it from the point $a$ to a point slightly to the right of that point as viewed in Fig. 17, then the center distances between $a$ and the axis of gear 46 is decreased while the distance between $a$ and the center of gear 63 is decreased. This corresponds to an adjustment of the gears to decrease the operating backlash of both gears. Obviously the opposite movement increases the operating backlash of both gears. In actual practice in adjustments of the gear-center distances, where the distance between the center of shaft 61 and the point about which this center was adjusted was .0075 inches, about .002 or .003 inches adjustment was permitted between the centers of gears 46 and 63, and the axis of the gears with which they meshed. It is thus possible to very accurately adjust the clearance or spacing of gears 60 and 46 to obtain a minimum of noise and the arrangement is such that the spacing of gears 63 and 62 may also be kept approximately correct so that the gears operate with practically no objectionable noise.

The motor is started and stopped by means of the motor-control switch 19 having a switch handle 101, the latter being shown in motor-energizing position in Fig. 8. This switch means 101 may be moved horizontally to an off position shown in Fig. 1 to stop the rotation of the motor. The motor-control switch is mounted by suitable bolts on the mounting plate 82 along side the control handle 18, and an interlock is provided between the motor switch and the speed-changing lever 18 to prevent operation of the motor-control switch to "on" position unless the control lever 18 is in one of the three positions corresponding to positions of the movable gear frame where the gear 70 or the gear 71 is in proper mesh with the gear 63 or the gear 68. The interlock is also arranged to prevent the control lever 18 from being operated when the motor is running so that the gear train will not be thrown out of mesh when power is applied to the beater arm. As shown in Figs. 8 and 9 the switch means 101 extends through an opening 102 in an interlock plate 103 which is slotted at 104 and 105 to receive the bushings 106 mounted on the supporting plate 82, and which thus guide the interlock plate 103 for reciprocatory movement toward and away from the shaft 81. The shaft 81 carries a notched plate 107 which is suitably grooved as shown at 108 to receive a pin 109 extending through the shaft so that the notched plate 107 rotates with the shaft. The spring 88 which presses against the movable cam plate 85 also presses against the hub portion of the notched plate as shown to maintain it against the mounting plate 82. The plate 107 is provided with three notches 110, 111 and 112 adapted to receive a rounded tongue 113 provided on the end of the interlock plate 103. The notch 110 will be in position to be engaged by the tongue 113 of the interlock plate when the lever 18 extends upwardly and the pointer 94 is adjacent position 3 corresponding to high-speed operation, and the notches 111 and 112 will be in position to be engaged by the tongue 113 at intermediate and low-speed settings respectively. When the control handle 18 is in one of the three operating positions and the gears are properly meshed or in position about ready to engage one another the switch 101 can be moved to motor-energizing or "on" position since the tongue 113 will not then be restrained by the cylindrical surface 114 of the notched plate, but in any other position of the control handle 18 this cylindrical surface 114 will prevent the motor-starting switch from being operated, and the operation of the motor therefore cannot be effected unless the gear train is properly meshed or about ready for meshing engagement. It will also be apparent that when the tongue 113 is in engagement with one of the notches of the notched plate and the motor is running, the control handle 18 cannot be operated until the motor-starting switch has been moved to its "off" position and the motor deenergized. To permit the operator to know when the control lever 18 is in the exact position to permit tongue 113 of the interlock plate to be received in one of the notches 110, 111, 112 the mounting plate 82 is preferably bulged inwardly as indicated at 115 in Figs. 9 and 11, the bulge being so shaped and positioned as to be received in the notch 112 when the control lever 18 is in intermediate-speed position, and to register with notch 111 and another notch 116 located an equal angular distance away from the notch 112 on the opposite side of the plate from the notch 111. The provision of this extra notch 116 is required as the notched plate is rotated less than 120° from one positioning to another. It will be apparent that the spring 88 permits the plate to ride over the bulge 115 when the control handle 18 is operated to change-gear speeds.

It will be apparent that the particular gear-changing arrangement employed in this apparatus cooperates particularly with the interlock for the motor, since the motor interlock is effective in its operation to permit starting of the motor even though the gears 71 and 63 for example are not in mesh, but on the other hand are resting one on the other at their peripheral portions. The instant the motor is started and the gear 63 moves, the driven gear 71, or the gear 70 of the shifting frame, as the case may be, will drop into full meshing engagement, due to the weight of the frame and the action of the spring 69. The motor interlock being such that the motor can be started even when the gears are not fully in mesh provides an arrangement which is particularly desirable, in that it permits the starting of the apparatus under any conditions as long as the gears are ready to mesh properly when the motor starts.

Suitable means are provided for maintaining a proper spacing of the shaft 72 from the shaft 64 when the gears 70 or 71 are engaged with the gears 68 or 63 to provide for suitable operating backlash of the gears. For this purpose a stop plate 120 is mounted on the housing 13 inside the latter in position to be engaged by a tongue 121 extending from the lower end of the frame 73. The stop plate 120 has surfaces 122, 123 and 124 suitably offset and spaced apart so that the tongue 121 may engage with these surfaces at low-speed, intermediate-speed, and high-speed adjustments respectively. The stop plate 120 is provided with a depending side 125 which is slotted at 126 to receive a fastening screw 127 threaded into a wall of the housing 13, so that the plate 120 is frictionally held loosely to the housing and guided for adjusting movements. The stop plate is provided with an end portion 128 which is guided in a slot 129 provided in a part 130 of the housing 13. The end 131 of this part of the stop plate engages a conical end 132 of an adjusting screw 133, which is threaded in the boss 134 of the lower wall of the housing 13 so that the adjusting member 133 is accessible from the bottom of this housing. A clock screw 187 preferably is threaded into the boss 134 to jam against the bottom of the adjusting screw 133 to hold the latter in adjusted position. The adjusting member 133 may be rotated after the temporary removal of the lock screw 187 to bring the stop plate to a suitable position to properly regulate the backlash of the gears. Thus the backlash of the gears is simultaneously adjusted for the three operating positions of the gears and the adjustments in the backlash may be easily effected from the exterior of the housing and during operation.

While the form of apparatus herein described constitutes a preferred embodiment of the invention, it is to be understood that the invention is not limited to this precise form of apparatus, and that changes may be made therein without department from the scope of the invention which is defined in the appended claims:

What is claimed is:—

1. In a food-handling machine of the class described, a driving member, a driven member, a change-speed gearing between said members including a tumbler gear rotatable about its axis and also shiftable endwise along its axis to engage mating gears, a control member for shifting said tumbler gear, and an operative interconection between said control member and said tumbler gear including a lost motion connection to permit said tumbler gear to remain out of meshing engagement with a mating gear when said control member is in an operative gear meshing position.

2. In a food-handling machine of the class described, a driving member, a driven member, a change-speed gearing between said members including a tumbler gear rotatable about its axis and also shiftable endwise along its axis to engage mating gears, a control member for shifting said tumbler gear, an operative interconnection between said control member and said tumbler gear including a lost motion connection to permit said tumbler gear to remain out of meshing engagement with a mating gear when said control member is in an operative gear meshing position, and means for definitely locating said control member in its gear meshing positions.

3. In a food-handling machine of the class described, a driving member, a driven member, a change-speed gearing between said members including a tumbler gear rotatable about its axis and also shiftable endwise along its axis to engage mating gears, a control member for shifting said tumbler gear, an operative interconnection between said control member and said tumbler gear including a lost motion connection to permit said tumbler gear to remain out of meshing engagement with a mating gear when said control member is in an operative gear meshing position, and means for resiliently urging said tumbler gear into meshing engagement with a mating gear.

4. In a food-handling machine of the class described, a driving member, a driven member, change-speed gears between said members comprising a frame, a gear rotatable on said frame, a sleeve to which said rotatable gear is fixed, said sleeve being in driving engagement with said driven member, the frame being mounted for rotation on said sleeve, and a pair of connected gears of different sizes rotatably mounted on said frame one of which is permanently in mesh with said mentioned gear, a key for holding said rotatable gear to said sleeve, means rotatable about the sleeve axis for retaining said key in said rotatable gear, said last means serving to fix said frame against axial movement on said sleeve, and means for moving said frame for engaging one of said members with one or the other of said pair of gears.

5. In a mixing machine of the class described, a driving gear, a driven gear, a pair of connected axially aligned gears one engaging said driving gear and one engaging said driven gear, and a sensitive eccentric adjustment for said pair of gears to vary the gear-center distances to adjust the backlash of said intermeshing gears.

6. In a food-handling machine of the class described, a driving gear, a driven gear, a pair of connected axially aligned gears, one engaging said driving gear and one engaging said driven gear, and sensitive adjusting means for shifting said pair of gears to vary gear-center distances to adjust the backlash of said intermeshing gears, the driving and driven gear axes being spaced apart and lying in different planes containing the axis of said aligned gears.

7. In a machine of the class described, a driving gear, a driven gear, a pair of interconnected gears one engaging said driving gear and one engaging said driven gear, an eccentric shaft of vernier eccentricity on which said pair of gears are mounted, and means for eccentrically adjusting said shaft to provide for slight movements of the axis of said shaft towards both the driven gear and the driving gear, and to provide for movements of the axis of said shaft towards one of said gears and away from the other of said gears, to thereby adjust the backlash of said intermeshing gears.

8. In combination, in a device of the class described, a driving member, a driven member, a change-speed gearing between said members comprising an adjustable gear, means supporting said gear to move first about an axis to disengage a mating gear and then to move in the direction of the axis and finally move about the axis to select a different mating gear, a control member for shifting said adjustable gear and means interconnecting the control means and the gear-supporting means for transforming one kind of movement of said control member into rotational and shifting movements of the gear-supporting means in the order stated.

9. In combination, in a device of the class described, a driving member, a driven member, a change-speed gearing between said members comprising an adjustable gear, mating gears adapted to be selectively engaged by the adjustable gear, means supporting said adjustable gear for movement about an axis parallel to the axis of the gear and for movement in the direction of said axis to select a mating gear, a rotatable control member, and means interconnecting the rotatable control member and the gear-supporting means for transforming rotary movement of said rotary member first into rocking movement of said adjustable gear about said axis to disengage a mating gear, then into shifting movement along said axis to bring the adjustable gear opposite a different mating gear, and finally into rocking movement of said adjustable gear about said axis toward engagement with said different mating gear.

10. In apparatus of the character described, having an electric motor, a motor control switch therefor, and an interlock for said switch; a driving member operatively connected with said motor, a driven member, change-speed gearing operatively interconnecting said driving and driven members and comprising an adjustable gear, a plurality of mating gears, means supporting said adjustable gear to move about a fixed axis displaced from the axis of the gear and to move in the direction of the fixed axis to select different mating gears, said adjustable gear being adapted to move into engagement with a selected mating gear automatically upon relative rotation of said adjustable gear and the respective mating gear, manual means for adjustably shifting said adjustable gear, said manual means being operatively associated with said interlock and having a plurality of gear meshing positions, and an operative interconnection between said manual means and said adjustable gear having a yielding portion adapted to provide for movement of said manual means to a definite gear meshing position irrespective of whether the said adjustable gear and the respective mating gear are in or cut of full operative meshing relationship.

11. In apparatus of the character described, having an electroc motor, a motor control switch therefor, and an interlock for said switch; a driving member operatively interconnected with said motor, a driven member, change-speed gearing operatively interconnecting said driving and driven members and comprising an adjustable gear, a plurality of mating gears, means supporting said adjustable gear to move about a fixed axis displaced from the axis of the gear and to move in the direction of the fixed axis to select different mating gears, a rotatable control member operatively associated with said interlock and having a plurality of definite gear meshing positions, and an operative interconnection between said rotatable control member and said adjustable gear for transforming rotary movement of said rotatable control member into rotational and shifting movements of said adjustable gear, said operative interconnection including a lost motion portion constructed to provide movement of said rotatable control member fully into an operative gear meshing position when said adjustable gear remains out of meshing engagement with a respective mating gear.

12. In apparatus of the character described, having an electric motor, a motor control switch therefor, and an interlock for said switch; a driving member operatively interconnected with said motor, a driven member, change-speed gearing operatively interconnecting said driving and driven members comprising a tumbler gear, a plurality of mating gears, means supporting said tumbler gear to move about a fixed axis displaced from the axis of the gear and to move in the direction of the fixed axis to select different mating gears, a rotatable control member operatively associated with said interlock and having a plurality of definite gear meshing positions, and an operative interconnection between said rotatable control member and said tumbler gear for transforming rotary movement of said rotatable control member into rotational and shifting movements of said tumbler gear, said operative interconnection including a yielding portion adapted to provide for movement of said rotatable control member fully into a gear meshing position when the cooperating teeth of said tumbler gear and a respective mating gear are so positioned as to prevent their movements into gear meshing relationship, whereby the rotatable control member may be moved to a gear meshing position to release said interlock and provide for operation of said motor control switch when said tumbler gear and the respective mating gear are not fully in gear meshing relationship, the tumbler gear and respective mating gear then moving automatically into operative gear meshing relationship upon the actuation of the motor control switch with the starting of the motor and driven parts.

13. In combination, a driving member, a driven member, a change-speed gearing between said members comprising an adjustable gear, mating gears adapted to be selectively engaged by the adjustable gear, means supporting said adjustable gear for movement about an axis to engage or disengage a mating gear and to shift bodily to select a different mating gear, a control member, a movable cam member operated thereby, a stationary cam member cooperating with the movable cam member, and means engaging both of said cam members for operating said gear-supporting means so that movements of the movable cam plate are effective in moving the gear-supporting means to disengage the adjustable gear from one mating gear and engage it with another mating gear.

14. In combination, a driving member, a driven member, a change-speed gearing between said members comprising an adjustable gear, mating gears adapted to be selectively engaged by the adjustable gear, means supporting said adjustable gear for movement about an axis to engage or disengage a mating gear and to shift bodily to select a different mating gear, a rotatable control member, a cam plate rotatably mounted and moved by said rotatable member, a stationary cam plate cooperating therewith, and a device on said gear-supporting means engaging said cam plates so that rotational movement of the rotatable cam plate imparts a combined shifting and rotational movement of the gear-supporting member for the purpose desired.

15. In combination, a driving member, a driven member, a change-speed gearing between said members comprising an adjustable gear, mating gears adapted to be selectively engaged by the adjustable gear, means supporting said adjustable gear for movement about an axis to engage or disengage a mating gear and to shift bodily to select a different mating gear, a rotatable control handle, a rotatable cam plate fixed thereto, a stationary cam plate adjacent said movable cam plate, and a projection of said gear-supporting means adapted to engage cam surfaces on both said cam plates so that the camming surfaces together control all of the shifting movements of the adjustable gear.

16. In combination, in a device of the class described, a driving member, a driven member, a housing, a change-speed gearing in said housing between said members comprising an adjustable gear means supporting said gear to move about an axis displaced from the axis of the gear and to move in the direction of said axis to select different mating gears, control means for said gear-supporting means, a stop plate having a plurality of displaced stop surfaces adapted to be engaged by said gear-supporting means in its various operative positions to provide backlash between the adjustable gear and the gear mating therewith, and means for adjustably positioning said stop for controlling the amount of backlash.

17. In combination, in a device of the class described, a driving member, a driven member, a housing, a change-speed gearing in said housing between said members comprising an adjustable gear means supporting said gear to move about an axis displaced from the axis of the gear and to move in the direction of said axis to select different mating gears, control means for said gear-supporting means, a stop provided in said housing and having a plurality of offset surfaces adapted to be engaged by a portion of the gear-supporting means to provide for backlash between the adjustable gear and the gear mating therewith, and means accessible from the exterior of said housing for adjustably positioning said stop.

18. In apparatus of the character described, a gear casing, a drive shaft having an end thereof extending only into one end of said gear casing and having a drive gear thereon within said gear casing, spaced parallelly extending shafts mounted within said gear casing, speed reducing intermeshing gearing on said parallelly extending shafts and in driven relationship with said drive gear, a tumbler gear shaft mounted within said gear casing parallel to said mentioned parallelly extending shafts, and a tumbler gearing rockably and axially movable on said tumbler gear shaft beyond the extending end of said drive shaft for interconnecting the said parallelly extending shafts with said tumbler gear shaft in different speed relationships.

19. In apparatus of the character described, a gear casing, a drive shaft having an end thereof extending only into one end of said gear casing at substantially the longitudinal axis thereof, a drive gear on said drive shaft within said gear casing, spaced parallelly extending shafts mounted generally on one side of said gear casing with respect to a transverse plane passing through the said longitudinal axis thereof, one of said parallelly extending shafts having a gear in intermeshing relationship with said drive gear, speed reducing intermeshing gearing interconnecting said spaced parallelly extending shafts, additional gearing on the other of said parallelly extending shafts, a tumbler gear shaft mounted generally on the other side of said gear casing with respect to said mentioned transverse plane and arranged parallel to said mentioned parallelly extending shafts, a gear on said tumbler gear shaft, and a tumbler gearing rockably and axially movable on said tumbler gear shaft beyond the extending end of said drive shaft for interconnecting the gearing on the other of said parallelly extending shafts with the gear on said tumbler gear shaft in different speed relationships.

20. In apparatus of the character described, a gear casing, a drive shaft extending within said gear casing, spaced parallelly extending shafts mounted within said gear casing, speed reducing intermeshing gearing on said parallelly extending shafts, a driving connection between said drive shaft and one of said parallelly extending shafts, a third parallelly extending shaft mounted within said gear casing, means including speed change gearing interconnecting said third shaft in driven relationship with the other of said parallelly extending shafts, a driven shaft extending generally at right angles to said third shaft and positioned within said gear casing beyond said speed reducing intermeshing gearing, and a driving connection between said third shaft and said driven shaft.

21. In apparatus of the character described, a gear casing generally circular in cross section, a drive shaft extending within said gear casing substantially at the longitudinal centre thereof, a shaft mounted within said gear casing at one side of the longitudinal center thereof and parallel with said drive shaft, speed reducing intermeshing gearing interconnecting said parallel shaft with said drive shaft, another shaft mounted within said gear casing at one side of the longitudinal center thereof and extending parallel with said drive shaft and spaced from said first mentioned parallel shaft, means including change speed gearing interconnecting said first mentioned parallel shaft with said other shaft, a driven shaft extending generally at right angles to said other shaft, and positioned within said gear casing beyond said speed reducing intermeshing gearing, and a driving connection between said other shaft and said driven shaft.

22. In apparatus of the character described, a gear casing generally circular in cross section having a substantially horizontal longitudinal axis, a horizontal drive shaft having an end thereof extending only into one end of said gear casing substantially in line with the longitudinal axis thereof, spaced parallelly extending horizontal shafts mounted within said gear casing at one side of the longitudinal axis thereof, speed reducing intermeshing gearing on said parallelly extending shafts, a driving connection between said drive shaft and one of said parallelly extending shafts, a third parallelly extending horizontal shaft mounted within said gear casing at one side of the longitudinal axis thereof and substantially in vertical alignment with said longitudinal axis, means including speed change gearing positioned beyond the said extending end of said drive shaft interconnecting said third shaft in driven relationship with the other of said parallelly extending shafts, a vertical driven shaft mounted within said gear casing beyond said speed reducing intermeshing gearing and said speed change gearing, and a driving connection between said third shaft and said vertical driven shaft.

23. In apparatus of the character described, a gear casing generally circular in cross section, a drive shaft extending within said gear casing substantially at the longitudinal center thereof, a shaft mounted within said gear casing at one side of the longitudinal center thereof and parallel with said drive shaft, speed reducing intermeshing gearing interconnecting said parallel shaft with said drive shaft, another shaft mounted within said gear casing at one side of the longitudinal center thereof and extending parallel with said drive shaft and spaced from said first mentioned parallel shaft, means including change speed gearing interconnecting said first mentioned parallel shaft with said other shaft, a driven shaft extending generally at right angles to said other shaft, and positioned within said gear casing beyond said speed reducing intermeshing gearing, a driving connection between said other shaft and said driven shaft, and a power take-off mounted in said gear casing in alignment with said other shaft and interconnected therewith in driven relationship, said power take-off being positioned at the end of said gear casing at the side of said driven shaft opposite from said speed reducing intermeshing gearing.

24. In apparatus of the character described, a gear casing generally circular in cross section having a substantially horizontal longitudinal axis, a horizontal drive shaft having an end thereof extending only into one end of said gear casing substantially in line with the longitudinal axis thereof, spaced parallelly extending horizontal shafts mounted within said gear casing at one side of the longitudinal axis thereof, speed reducing intermeshing gearing on said parallelly extending shafts, a driving connection between said drive shaft and one of said parallelly extending shafts, a third parallelly extending horizontal shaft mounted within said gear casing at one side of the longitudinal axis thereof and substantially in vertical alignment with said longitudinal axis, means including speed change gearing positioned beyond the extending end of said drive shaft interconnecting said third shaft in driven relationship with the other of said parallelly extending shafts, a vertical driven shaft mounted within said gear casing beyond said speed reducing intermeshing gearing and said speed change gearing, a driving connection between said third shaft and said vertical driven shaft, and a horizontal power take-off mounted in said gear casing in alignment with said third parallelly extending horizontal shaft and interconnected therewith in driven relationship, said power take-off being positioned at the end of said gear casing at the side of said vertical driven shaft opposite from said speed reducing intermeshing gearing and said speed change gearing.

In testimony whereof we hereto affix our signatures.

HERBERT L. JOHNSTON.
DAVID A. MEEKER.